US010615910B2

(12) United States Patent
Seo et al.

(10) Patent No.: US 10,615,910 B2
(45) Date of Patent: Apr. 7, 2020

(54) METHOD FOR TRANSMITTING OR RECEIVING SIGNAL IN WIRELESS COMMUNICATION SYSTEM AND APPARATUS THEREFOR

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,754

(22) PCT Filed: Apr. 24, 2018

(86) PCT No.: PCT/KR2018/004725
§ 371 (c)(1),
(2) Date: Jun. 21, 2018

(87) PCT Pub. No.: WO2018/199585
PCT Pub. Date: Nov. 1, 2018

(65) Prior Publication Data
US 2019/0103941 A1    Apr. 4, 2019

Related U.S. Application Data

(60) Provisional application No. 62/519,157, filed on Jun. 13, 2017, provisional application No. 62/489,419, filed on Apr. 24, 2017.

(51) Int. Cl.
*H04L 1/00* (2006.01)
*H04L 25/02* (2006.01)
(Continued)

(52) U.S. Cl.
CPC .............. *H04L 1/0038* (2013.01); *H04L 1/00* (2013.01); *H04L 1/0009* (2013.01);
(Continued)

(58) Field of Classification Search
CPC ....... H04L 1/0038; H04L 1/00; H04L 1/0071; H04L 5/00; H04L 5/0053; H04L 25/0202; H04L 5/0007; H04W 72/042
See application file for complete search history.

(56) References Cited

U.S. PATENT DOCUMENTS

2013/0242904 A1*  9/2013  Sartori ................. H04L 5/0053
                                                      370/329
2014/0233541 A1    8/2014  Kim et al.
(Continued)

FOREIGN PATENT DOCUMENTS

KR    1020120103619      9/2012
KR    1020120135201      12/2012
(Continued)

OTHER PUBLICATIONS

Wilus Inc., R1-1705849, Discussion on Blind Decoding Enhancement for NR-PDCCH, 3GPP TSG RAN WG1 #88bis, 3GPP (Mar. 25, 2017) See sectioin 1, p. 3, figure 1. (Year: 2017).*
(Continued)

*Primary Examiner* — Luat Phung
(74) *Attorney, Agent, or Firm* — Fish & Richardson P.C.

(57) ABSTRACT

According to one embodiment of the present invention, a method of receiving DCI by a UE includes receiving bundling information regarding REGs via higher layer signaling, performing blind detection for a PDCCH in a CORESET configured on a plurality of OFDM symbols, and acquiring DCI from the PDCCH. When the bundling information indicates a first value, the UE may perform bundling such that only REGs locating on a same RB and corresponding to different OFDM symbols in the CORESET, are bundled as 1 REG bundle, and when the bundling information indicates a second value, the UE may perform bundling such that the REGs locating on the same RB and corresponding to the different OFDM symbols are bundled as 1
(Continued)

REG bundle along with REGs locating on different RBs in the CORESET, and the UE may perform the blind detection of the PDCCH by assuming same precoding for REGs belonging to a same REG bundle as a result of REG bundling.

20 Claims, 13 Drawing Sheets

(51) Int. Cl.
 *H04L 5/00* (2006.01)
 *H04W 72/04* (2009.01)
(52) U.S. Cl.
 CPC .......... *H04L 1/0046* (2013.01); *H04L 1/0071* (2013.01); *H04L 1/0072* (2013.01); *H04L 5/00* (2013.01); *H04L 5/0053* (2013.01); *H04L 25/0202* (2013.01); *H04L 5/0007* (2013.01); *H04W 72/042* (2013.01)

(56) References Cited

U.S. PATENT DOCUMENTS

| | | | |
|---|---|---|---|
| 2016/0302174 | A1 | 10/2016 | Chatterjee et al. |
| 2018/0227156 | A1* | 8/2018 | Papasakellariou ........................ H04L 27/2613 |
| 2018/0279135 | A1* | 9/2018 | Hwang ................ H04L 1/1861 |
| 2018/0288747 | A1* | 10/2018 | Sun ...................... H04L 5/0007 |

FOREIGN PATENT DOCUMENTS

| | | |
|---|---|---|
| KR | 1020130058687 | 6/2013 |
| KR | 1020150038581 | 4/2015 |
| KR | 1020160036588 | 4/2016 |
| RU | 2251609 | 5/2005 |
| RU | 2559047 | 8/2015 |

OTHER PUBLICATIONS

Huawei et al., R1-1700413, PRB bundling size for DL data precoding, 3GPP TSG RAN WG1 #AH, 3GPP (Jan. 9, 2017) See section 1, section 2. (Year: 2017).*

MCC Support, Ri-17xxxxx, Draft Report of 3GPP TSG RAN WG1 #88bis v0.1.0 (Spokane, USA, Apr. 3-7, 2017), 3GPP TSG RAN WG1 #88bis, 3GPP (Apr. 12, 2017) See page 101-102. (Year: 2017).*

Panasonic, R1-1705173, The relation among RS, REG, CCE, and CORSET, 3GPP TSG RAN WG1 #88bis, 3GPP (Mar. 24, 2017) See the whole document. (Year: 2017).*

Russian Notice of Allowance in Russian Application No. 2019103867, dated Jul. 8, 2019, 25 pages (with English translation).

LG Electronics, "Discussion on search space design," R1-1702477, 3GPP TSG RAN WG1 Meeting #88, Athens, Greece, Feb. 13-17, 2017, 3 pages, XP051221335.

Extended European Search Report in European Application No. 18791651.5, dated Oct. 9, 2019, 19 pages.

Vivo, Samsung, ZTE, ZTE Microelectronics, Interdigital, "WF on blind decoding on CORESET," R1-1706692, 3GPP TSG RAN WG1 88bis Meeting, Spokane, USA, dated Apr. 3-7, 2017, 47 pages.

Ericsson, "On CORESETs," R1-1706753, RAN1#87, Reno, dated Apr. 5, 2017.

Korean Notice of Allowance in Korean Application No. 10-2018-0149767, dated Oct. 25, 2019, 4 pages.

* cited by examiner

-- RELATED ART --

(a) REG bundle size = 1 REGs (b) REG bundle size = 2 REGs (a) separate indexing (b) combined indexing (a)

(b)

(a) 1/3 RS pattern (b) 1/4 RS pattern (c) 1/6 RS pattern

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/004725, filed on Apr. 24, 2018, which claims the benefit of U.S. Provisional Application No. 62/519,157, filed on Jun. 13, 2017, and U.S. Provisional Application No. 62/489,419, filed on Apr. 24, 2017. The disclosures of the prior applications are incorporated by reference in their entirety.

TECHNICAL FIELD

The present invention relates to a wireless communication system, and more particularly, to a method and apparatus for transmitting and receiving a downlink (DL) control information in a wireless communication system.

BACKGROUND ART

First, the existing 3GPP LTE/LTE-A system will be briefly described. Referring to FIG. 1, the UE performs an initial cell search (S101). In the initial cell search process, the UE receives a Primary Synchronization Channel (P-SCH) and a Secondary Synchronization Channel (S-SCH) from a base station, performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

An object of the present invention devised to solve the problem lies in a method and apparatus for more effectively and accurately transmitting or receiving downlink control information through resource element group (REG) bundling in wireless communication system.

It is to be understood that both the foregoing general description and the following detailed description of the present invention are exemplary and explanatory and are intended to provide further explanation of the invention as claimed.

Technical Solution

In an aspect of the present invention to achieve the object of the present invention, a method of receiving downlink control information by a user equipment (UE) in a wireless communication system, includes receiving, via higher layer signaling, bundling information regarding resource element groups (REGs), each of the REGs corresponding to 1 resource block (RB) and 1 orthogonal frequency divisional multiplexing (OFDM) symbol; performing blind detection for a physical downlink control channel (PDCCH) in a control resource set (CORESET) configured on a plurality of OFDM symbols; and acquiring downlink control information (DCI) from the blind-detected PDCCH, wherein in the blind detection for the PDCCH, when the bundling information indicates a first value, the UE may perform bundling such that only REGs locating on a same RB and corresponding to different OFDM symbols in the CORESET, are bundled as 1 REG bundle, and when the bundling information indicates a second value, the UE may perform bundling such that the REGs locating on the same RB and corresponding to the different OFDM symbols are bundled as 1 REG bundle along with REGs locating on different RBs in the CORESET, and wherein the UE may perform the blind detection of the PDCCH by assuming same precoding for REGs which belong to a same REG bundle as a result of REG bundling.

In other aspect of the present invention, a method of transmitting downlink control information by a base station (BS) in a wireless communication system, includes transmitting, via higher layer signaling, bundling information regarding resource element groups (REGs), each of the REGs corresponding to 1 resource block (RB) and 1 orthogonal frequency divisional multiplexing (OFDM) symbol; and transmitting downlink control information (DCI) through a physical downlink control channel (PDCCH) in a control resource set (CORESET) configured on a plurality of OFDM symbols, wherein in transmitting the DCI, when the bundling information indicates a first value, the BS may perform bundling such that only REGs locating on a same RB and corresponding to different OFDM symbols in the CORESET, are bundled as 1 REG bundle, when the bundling information indicates a second value, the BS may perform bundling such that the REGs locating on the same RB and corresponding to the different OFDM symbols are bundled as 1 REG bundle along with REGs locating on different RBs in the CORESET, and wherein the BS may transmit the DCI by applying same precoding for REGs belonging to a same REG bundle as a result of REG bundling.

In another aspect of the present invention, a user equipment (UE) for receiving downlink control information, includes a receiver; and a processor to receive, via higher layer signaling by using the receiver, bundling information regarding resource element groups (REGs), each of the REGs corresponding to 1 resource block (RB) and 1 orthogonal frequency divisional multiplexing (OFDM) symbol, to perform blind detection for a physical downlink control channel (PDCCH) in a control resource set (CORESET) configured on a plurality of OFDM symbols, and to acquire downlink control information (DCI) from the blind-detected PDCCH, wherein in the blind detection for the PDCCH, when the bundling information indicates a first value, the processor may perform bundling such that only REGs locating on a same RB and corresponding to different OFDM symbols in the CORESET, are bundled as 1 REG bundle, and when the bundling information indicates a second value, the processor may perform bundling such that the REGs locating on the same RB and corresponding to the different OFDM symbols are bundled as 1 REG bundle along with REGs locating on different RBs in the CORESET, and wherein the processor may perform the blind detection of the PDCCH by assuming same precoding for REGs which belong to a same REG bundle as a result of REG bundling.

In another aspect of the present invention, a base station (BS) for transmitting downlink control information, includes a transmitter; and a processor to transmit, via higher layer signaling by using the transceiver, bundling information regarding resource element groups (REGs), each of the REGs corresponding to 1 resource block (RB) and 1 orthogonal frequency divisional multiplexing (OFDM) symbol, and to transmit downlink control information (DCI) through a physical downlink control channel (PDCCH) in a control resource set (CORESET) configured on a plurality of OFDM symbols, wherein in the transmission of the DCI, when the bundling information indicates a first value, the processor may perform bundling such that only REGs locating on a same RB and corresponding to different OFDM symbols in the CORESET, are bundled as 1 REG bundle, when the bundling information indicates a second value, the processor may perform bundling such that the REGs locating on the same RB and corresponding to the different OFDM symbols are bundled as 1 REG bundle along with REGs locating on different RBs in the CORESET, and wherein the processor may transmit the DCI by applying same precoding for REGs belonging to a same REG bundle as a result of REG bundling.

When the bundling information indicates the first value, 1 REG bundle size may be configured to be the same as the number of the plurality of OFDM symbols for configuring the CORESET.

When the bundling information indicates the second value, 1 REG bundle size may be configured to be the same as the number of REGs included in 1 control channel element (CCE).

One or more CORESETs including the CORESET may be configured in the UE. The bundling information and a control channel element (CCE)-to-REG mapping type may be indicated for each of the one or more CORESETs.

The bundling information may include bundle size information indicating the number of REGs included in 1 REG bundle.

The control channel element (CCE)-to-REG mapping type of the CORESET may be configured as an interleaved mapping type among a localized mapping type and the interleaved mapping type.

Interleaving for the CCE-to-REG mapping may be performed in a unit of a REG bundle using an REG bundle index.

A supported bundle size may be differently determined according to the CCE-to-REG mapping type.

The bundling information may include at least one of intra-CCE bundle size information for bundling of REGs belonging to the same control channel element (CCE) and inter-CCE bundle size information for bundling of REGs belonging to different control channel elements (CCEs). When the bundling information includes the inter-CCE bundle size information, the UE may perform blind detection for the PDCCH by assuming the same precoding for REGs of different CCEs belonging to the same inter-CCE bundle.

When the bundling information indicates the first value, the UE may perform time domain REG bundling and, when the bundling information indicates the second value, the UE may perform time-frequency domain REG bundling.

The number of the plurality of OFDM symbols for configuring the CORESET may be 2 or 3.

The UE may perform demodulation for the PDCCH by assuming that the same precoding is applied to reference signals received through REGs belonging to the same REG bundle.

Advantageous Effects

According to an embodiment of the present invention, a user equipment (UE) performs time domain bundling or time-frequency domain bundling according to indication of a network and assumes the same precoding with respect to a plurality of resource element groups (REGs) belonging to 1 REG bundle and, thus, detection for a physical downlink control channel (PDCCH) carrying downlink control information (DCI) may be more accurately and effectively performed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

MODE FOR INVENTION

Figure 1:
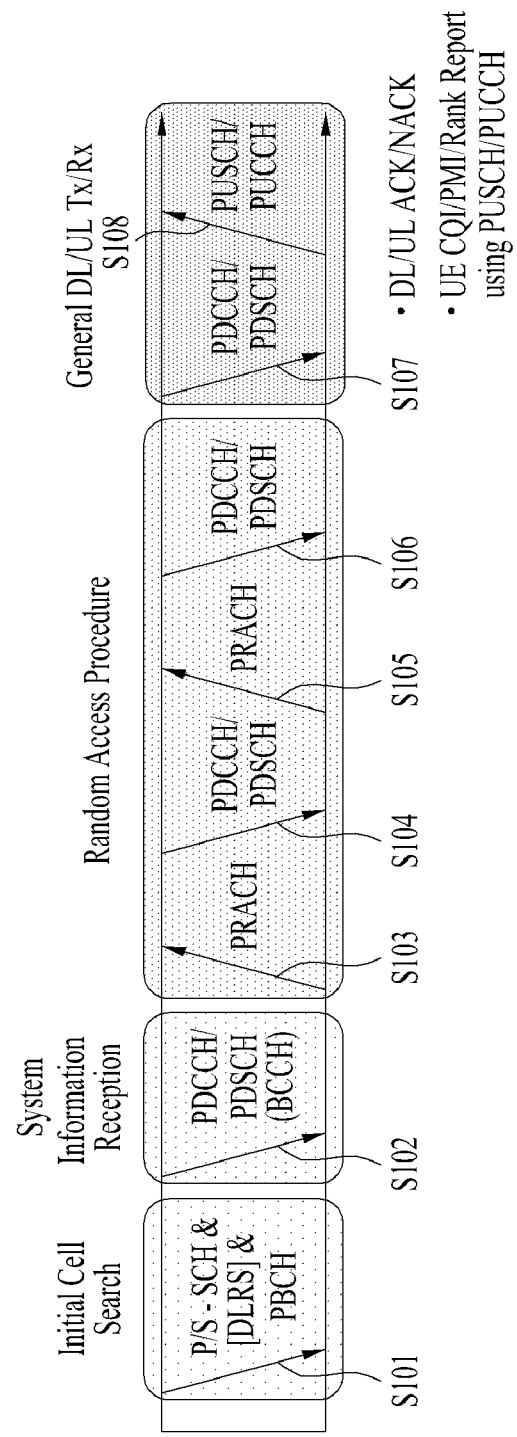
FIG. 1 illustrates physical channels used in a 3GPP LTE/LTE-A system and a general signal transmission method using the physical channels.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/UE that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In an NR system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{slot}^{subframe,\mu}$ contiguous OFDM symbols. $N_{symb}^{slot}$ represents the number of symbols per slot, $\mu$ represents OFDM numerology, and $N_{slot}^{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the ca se of extended CP.

TABLE 3

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information —reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

An eNB may signal information on a CORESET to a UE. For example, a CORESET configuration for each CORESET may be signaled to the UE, and the CORESET configuration may be signaled in time duration (e.g., 1/2/3 symbol), etc. of the corresponding CORESET. Information included in the CORESET configuration is described below in detail.

<Bundling for NR-PDCCH>

Prior to a description of resource bundling in an NR system, physical resource block (PRB) bundling in a legacy LTE system is described briefly. When a DMRS with lower density than a cell specific RS (CRS) is used in an LTE system, an available resource is increased for data transmission but, as the number of available RSs for channel estimation is increased, channel estimation performance may be degraded. As such, to minimize degradation in channel estimation performance during DMRS use, PRB bundling is introduced in an LTE system. For ex ample, to ensure channel estimation performance in a transmission mode in which a DMRS is used, sections in which the same precoding is applied may be defined as a PRB bundle and, in the corresponding sections, a UE may perform channel estimation using RSs belonging to different PRBs. For example, DMRS 2 mapped to PRB 2 as well as DMRS 1 mapped to PRB 1 may be used for channel estimation of demodulation of data mapped to PRB 1. For valid channel estimation in units of PRB bundles, the same precoding needs to be applied to DMRS 1 and DMRS 2.

To enhance system flexibility in NR, reduction in use of a common RS has been discussed. The common RS may be a cell-commonly transmitted RS and may refer to an always on RS that is not capable of being on/off UE-specifically. For example, a cell-specific RS (CRS) of an LTE system may be an example of the common RS.

A design for reduction in the common RS is also applied to a control channel (e.g., PDCCH) of NR and, thus, it may be desirable to perform bundling between different control channel resources to enhance channel estimation performance of a control channel.

Hereinafter, it is assumed that 1 REG=1 PRB & 1 OFDM symbol, and 1 CCE=6 REGs but the present invention is not limited thereto and the present invention may also be applied to the case in which various resource units, e.g., REG, CCE, and PDCCH candidate are configured using different methods. As another example of definition of an REG, 1 REG may correspond to 12 contiguous resource elements (REs) in the frequency domain and the number of REs used for control information transmission may be changed according to whether an RS is included in the corresponding REG and/or whether a reserved resource is present.

Hereinafter, the RS may include an RS for demodulation of a control channel, an RS for positioning, CSI-RS for CSI feedback, an interference measurement resource (IMR), a cell-specific tracking RS (e.g., phase tracking), a radio link monitoring (RLM)-RS, and/or radio resource management (RRM)-RS, etc. and for convenience of description, the present invention is mainly described in terms of an RS for demodulation of a control channel.

Figure 2:
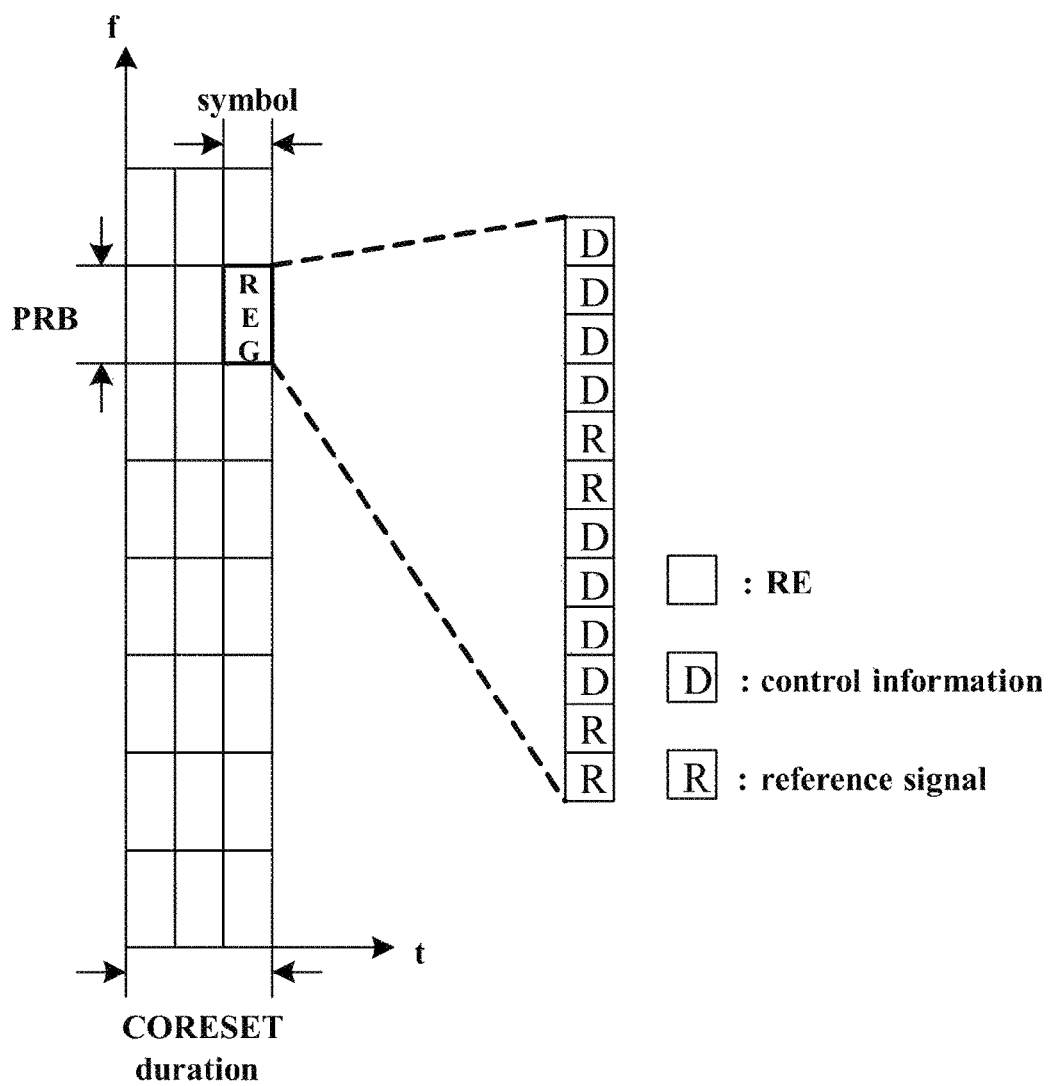
FIG. 2 illustrates an NR control region according to an embodiment of the present invention.

FIG. 2 illustrates a NR control region according to an embodiment of the present invention.

A CORESET may correspond to a region in which REG/CCE indexing is performed. 1 UE may be configured with one or more CORESETs from a network. When a plurality of CORESETs is configured for 1 UE, the respective CORESETs may have different properties. For example, a CCE-to-REG mapping type, a PDCCH-to-CCE mapping type, and/or an RS configuration, etc. for each CORESET may be defined via high layer signaling (e.g., CORESET configuration).

Although FIG. 2 illustrates only CORESET duration in the time domain, a range of a CORESET may also be configured in the frequency domain.

Bundling of an REG level may be applied to an NR control channel. When the bundling of an REG level is applied, the same precoding may be applied to different REGs belonging to the same bundle.

When different REGs belonging to the same bundle belongs to 1 CCE, such REG bundling may be defined as intra-CCE REG bundling. When different REGs belonging to the same bundle belongs to different CCEs, such REG bundling may be defined as inter-CCE bundling.

Hereinafter, a method of performing bundling on an NR control channel is proposed. In the following examples, 1 CCE=6 REGs is assumed but the present invention may also be applied to the case in which the number of REGs per CCE may be differently defined.

REG bundling in an NR control channel may be defined in the frequency domain and/or the time domain. An operating method, etc. of a UE and an eNB for bundling in each domain is described below.

Frequency Domain Bundling

In terms of a network, frequency domain REG bundling may apply the same precoding to different REGs on the same time instance. A UE may perform channel estimation using RSs on different REGs belonging to the same bundle, thereby enhancing channel estimation performance.

Figure 3:
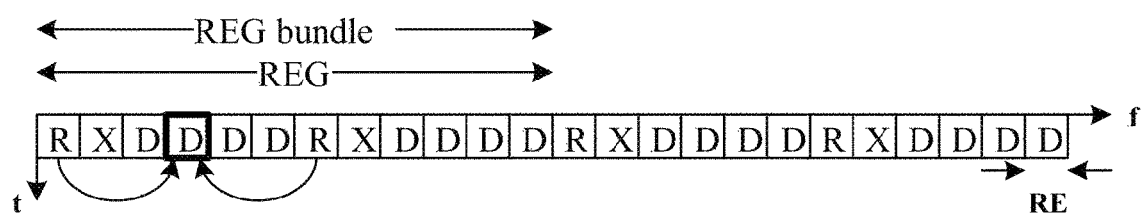
FIG. 3 illustrates frequency domain bundling according to an embodiment of the present invention.
Figure 3:
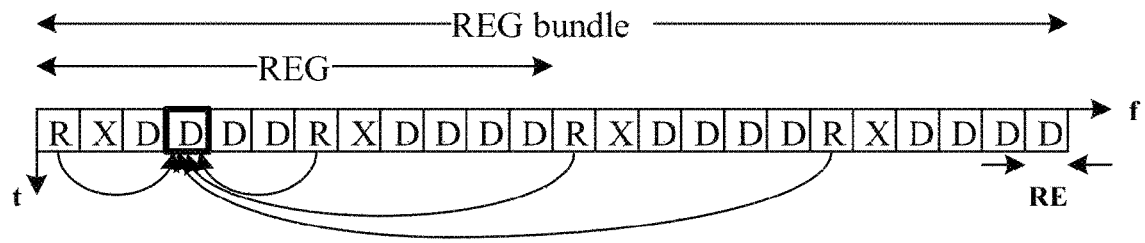

FIG. 3 illustrates an example of frequency domain bundling.

R refers to an RE in which a reference signal is transmitted, D refers to an RE in which control information is transmitted, and X refers to an RE in which an RS of another antenna port is transmitted.

When a bundle size is 1 REG (i.e., when REG bundling is not applied), channel estimation for each RE in which control information is transmitted may be performed using an RS in a corresponding REG. When a bundle size is 2 REGs, channel estimation for each RE in which control information is transmitted may be performed using all RS(s) present in the bundle size.

Accordingly, when a bundle size is greater than 1 REG, a UE may perform channel estimation using as many as possible RS(s) to enhance channel estimation performance.

In the case of frequency domain bundling, it may be desirable to differently configure a size of bundling according to a resource mapping type of a CORESET in which bundling is performed. For example, when a CCE-to-REG mapping method indicted through a CORESET configuration is distributed mapping (e.g., interleaving), a bundle size may be determined in consideration of both channel estimation performance and frequency diversity gain. When the frequency diversity gain determines overall performance compared with the channel estimation performance, it may be desirable not to perform bundling for enhancing the channel estimation performance or maintain a bundle size in a small value (e.g., 2 REGs). On the other hand, when the channel estimation performance is more important than acquisition of the frequency diversity gain, it may be desirable to configure the bundle size as a large value (e.g., 3 REGs) to enhance the channel estimation performance.

As such, to adaptively correspond to various channel environments, a network may configure a bundle size for each specific resource region (e.g., CORESET). For example, an REG bundle size for each CORESET may be indicated to a UE via higher layer signaling (e.g., CORESET configuration), etc.

In the case of localized mapping, it may be desirable to support a large bundle size (e.g., maximum REG bundle size). The bundle size of the localized mapping may be more largely configured than a bundle size of the distributed mapping.

Use of the localized mapping may mean that a network applies appropriate precoding to a UE due to relatively accurate channel information between the network and the UE. In this case, the network may deploy all REGs configuring a CCE to be adjacent to each other in the frequency domain and may apply the same precoding to REGs. For example, in the case of non-Interleaved (i.e. localized) CCE-to-REG mapping, 1 CCE may correspond to an REG bundle. In other words, an REG bundle size may also be fixed to 1 CCE (i.e., 6 REGs) during localized mapping.

According to an embodiment of the present invention, signaling of different bundle sizes according to a resource mapping type (i.e., REG-to-CCE mapping type) by a network with respect to frequency domain bundling is proposed. A supported bundle size may be determined according to an REG-to-CCE mapping type. For example, in localized mapping, an REG bundle size may be fixed to 6-REG and, in distributed mapping (e.g., interleaving), a network may configure an REG bundle size for a UE via higher layer signaling (e.g., CORESET configuration).

Signaling of different bundle sizes according to a resource mapping type by a network may mean that a maximum value of a bundle size for each resource mapping type (e.g., localized/distributed mapping) is differently configured. For example, when the number of bits for signaling a bundle size is equalized in both localized/distributed mappings (e.g., when the number of available bundle sizes is constant irrespective of a resource mapping type), a bundle size indicated by a corresponding bit value may be differently defined according to a resource mapping method. For example, assuming that a bundle size is indicated by 1 bit, 1 Bit=0/1 may represent bundle size=2/3 REGs in the distributed mapping, and 1 Bit=0/1 may represent bundle size=3/6 REGs in the localized mapping.

Another bundle size may also be defined for inter-CCE bundling. For example, the aforementioned bundle size may refer to an intra-CCE bundle size, and a maximum bundle size may be additionally defined for inter-CCE bundling separately from an intra-CCE bundle size. When REGs belonging to different CCEs are positioned adjacently to each other, a network may perform frequency domain bundling on REGs positioned in a maximum bundle size. As such, a maximum bundling size for the inter-CCE bundling may refer to a distance between REGs in which the inter-CCE bundling is permissible. For example, the maximum bundling size may be defined on the frequency domain. For example, the maximum bundling size may be defined on the frequency domain and/or the time domain.

A first bundle size for the intra-CCE bundling and a second bundle size for the inter-CCE bundling may be independently signaled. A network/UE may perform REG indexing/CCE indexing, etc. based on a first bundle size or the like in the intra-CCE bundling and may perform the inter-CCE bundling on REGs belonging to different CCEs in the second bundle size after CCE aggregation. The second bundle size for the inter-CCE bundling may be configured as a value for including a predetermined number of intra-CCE REG bundle(s). For example, the second bundle size may be determined an integer multiple of the first bundle size. For example, when the intra-CCE bundling is performed in units of 2-REG (e.g., first bundle size=2-REG) and the second bundle size for the inter-CCE bundling is configured as 4-REG, a UE may assume the same precoding with respect to 2 intra-CCE REG bundles (i.e., total of 4 REGs) belonging to different CCEs and may perform channel estimation.

Alternatively, the UE may assume that a PRB bundle size configured in a data (e.g., PDSCH) region is also applied to a control channel. Such assumption may be applied to both cases in which REGs present in a corresponding bundle size are contiguous or noncontiguous and may also be applied to intra-CCE and/or inter-CCE.

For example, assuming that 6-REG is mapped to 1 CCE via localized mapping and 4-RB configures 1 bundle in the case of a PDSCH, the intra-CCE REG bundle size or the inter-CCE bundle size may be configured as 4. For example, assuming that 2 CCEs (e.g., CCE#0 and CCE#1) for an aggregation level (AL)-2 channel candidate are contiguous in the frequency domain, REG bundling may be performed according to [first bundle: 4-REG of CCE#0]+[second bundle: 2-REG of CCE#0 & 2-REG of CCE#1]+[third bundle: 4-REG of CCE#1].

To apply an REG bundle on the frequency domain, it may be required to determine a boundary at which an REG bundle is started/ended. For example, as described in (i) to (v), a boundary of an REG bundle may be determined. When methods of (i) or (iv) is used, it may be desirable to configure a bandwidth or PRB number configured for a UE as a multiple of a bundle size.

(i) A bundle size may be applied from a lowest frequency (e.g., lowest subcarrier) in a CORESET configured for a UE. For example, REG indexing and/or REG bundle indexing may be used for each CORESET and, when interleaving is used, interleaving may be performed in units of REG bundles. When a reserved resource is present in a bundle size or a PRB that is not allocated to a UE is present, an actual bundle size of the UE may be smaller than a bundle size indicated from a network.

(ii) A bundle size may be applied from a lowest frequency in a UE-specific bandwidth configured for the UE. When a reserved resource is present in a bundle size or a PRB that is not allocated to the UE is present, an actual bundle size of the UE may be smaller than a bundle size indicated from a network.

(iii) A bundle size may be applied from a lowest frequency in an entire system bandwidth. When a reserved resource is present in a bundle size or a PRB that is not allocated to the UE is present, an actual bundle size of the UE may be smaller than a bundle size indicated from a network.

(iv) The frequency domain to which an REG bundle is to be applied may be separately configured and a bundle size may be applied from a lowest frequency in the corresponding frequency domain. When a reserved resource is present in a bundle size or a PRB that is not allocated to the UE is present, an actual bundle size of the UE may be smaller than a bundle size indicated from a network.

(v) The UE may consider a starting point of a control channel candidate as a position where REG bundling is started. For example, a bundle size may be applied from a start CCE or start REG of the candidate. The UE may assume that the same precoding is applied to corresponding REGs when different REGs belonging to the same candidate are present in a bundle size. When REGs belonging to the candidate are distributed to different groups, the UE may consider a starting point of each group as a starting point of a bundle.

When a precoder cycling in which precoding is cyclically changed every specific resource unit, or the like is used, bundling may be performed in the same resource unit as the resource unit in which the precoder cycling is applied. For example, assuming that 2 precoders are cyclically applied on contiguous REGs, even index REGs may be bundled and odd index REGs may be bundled. This may be understood as bundling at an REG group (e.g., even REG group/odd REG group) level. For example, REGs to which Precoder 1 is applied may correspond to a first REG group bundle and REGs to which Precoder 2 is applied may correspond to a second REG group bundle. In this case, even if precoder cycling is used, the UE may assume the same precoding with respect to REGs belonging to the same bundle.

When REG bundling and precoder cycling are used together, the REG bundling may not be always performed on contiguous REGs. For example, noncontiguous REGs may belong to the same REG bundle. In this case, a UE may be allocated with an REG or RB bundle size from a network and one or more precoders may be present in the allocated REG/RB bundle size. The UE may be configured with the number of precoders in the REG/RB bundle size from a network. The number of precoders in the REG/RB bundle size may be different according to a method of configuring precoder cycling.

Configuration of precoder cycling with REG/RB bundle size: For example, to perform precoder cycling every RB/REG (e.g., to change a precoder in units of RB/REGs), a network may configure a bundle size as 1.

Configuration of REG bundle along with configuration of precoder cycling: A network may allocate an REG bundle size and the number of precoders to be used in each bundle to the UE. Assuming that 2 precoders cycle in a 6-RB bundle, the network may perform precoder cycling in units of 1 REG/RB and, in this case, 3 RBs may share the same precoder.

Time-domain Bundling

Similarly to frequency domain bundling, the same precoding may also be applied to REGs in a bundle size in the case of time domain bundling.

According to a method of applying the same precoding, time domain bundling may be differently defined. According to an embodiment of the present invention, the time domain bundling may be defined as two types as follows and a network may signal a type of time domain bundling, to be used for each resource region (e.g., CORESET, sub-CORESET).

(1) Time Domain Bundling Type 1: When RS is Transmitted in all REGs in Bundle

Type 1 bundling may be used to enhance channel estimation performance. To enhance channel estimation, each of REGs in the time domain bundle size may include an RS. Density of the RS may be different for each REG. For example, density of an RS mapped to an REG of a first OFDM symbol and density of an RS mapped to an REG of a second OFDM symbol may be different.

As one of available operations of a UE with respect to Type 1 bundling, channel estimation may be performed using all RSs in a bundle. For example, to obtain a channel coefficient of a specific data RE through 2D-minimum mean square error (MMSE)-based channel estimation, the UE may use all RSs in a bundle to which the specific data RE belongs. In this case, similarly to the frequency domain bundling, the UE may perform channel estimation using a plurality of RSs to enhance channel estimation performance.

As another operation of a UE that performs Type 1 bundling, the UE may performs channel estimation for each REG and, in this case, may use an average of channel estimation results of REGs in a bundle as a final channel estimation result. In this case, when REGs in a bundle are present in a coherent time and channel variation barely occurs, noise may be suppressed.

(2) Time Domain Bundling Type 2: When RS is Transmitted Only in REG in Bundle (e.g., RS of Front-Loaded REG)

Type 2 bundling may be used as a method of reducing RS overhead to acquire coding gain of control information. When Type 2 bundling is used, a network may transmit an RS only some REGs of REGs in a bundle and may map control information to an RE position from which an RS is omitted in the other REGs in which an RS is not transmitted, thereby lowering a coding rate of the control information.

In Type 2 bundling, a UE may perform channel estimation in an REG in which an RS is transmitted and may reuse a channel estimation result with respect to an REG in which an RS is not transmitted. Such reuse of the channel estimation result may be based on REG bundling definition for applying the same precoding to REGs in a bundle.

Figure 4:
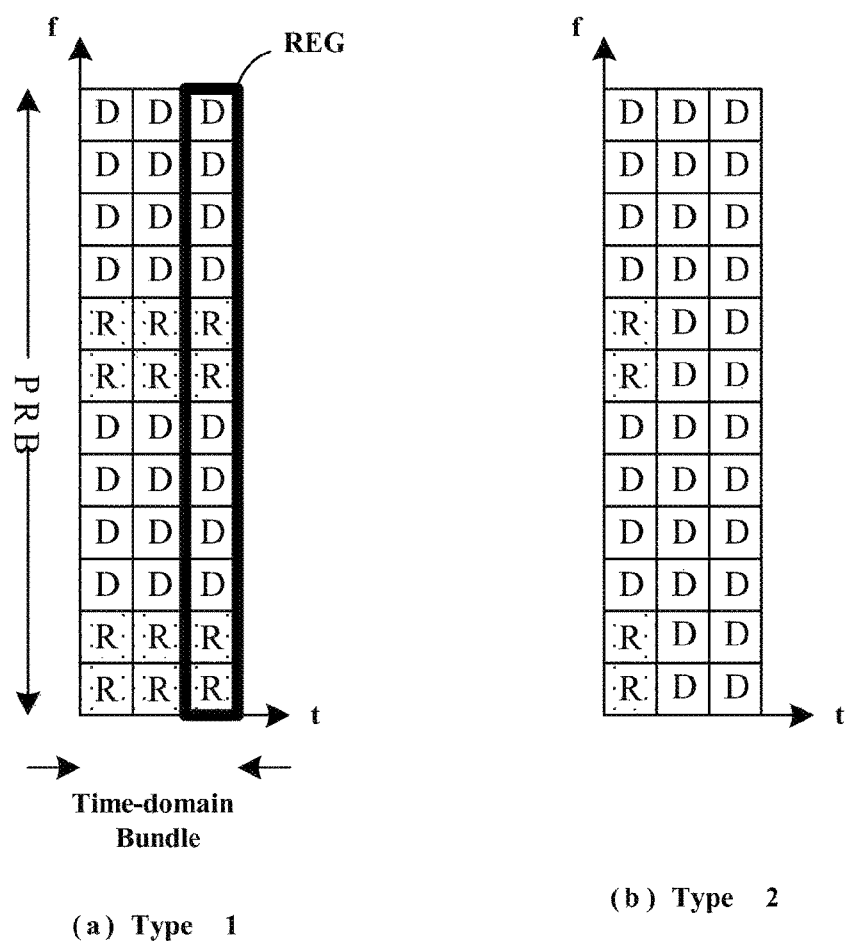
FIG. 4 illustrates a time domain bundling type according to an embodiment of the present invention.

FIG. 4 illustrates time domain bundling Types 1/2 according to an embodiment of the present invention. R refers to an RE in which an RS is transmitted and D refers to an RE in which control information is transmitted. RSs of the same antenna port may be mapped to all RS REs or RSs of different antenna ports may be multiplexed and mapped using an FDM/CDM method.

As described above, time domain REG bundling may be defined as Types 1/2 and a network may apply/signal different types of time domain bundling for respective resource regions.

As another example, when a specific condition is satisfied, application of a specific type of time domain bundling may also be predefined.

Figure 5:
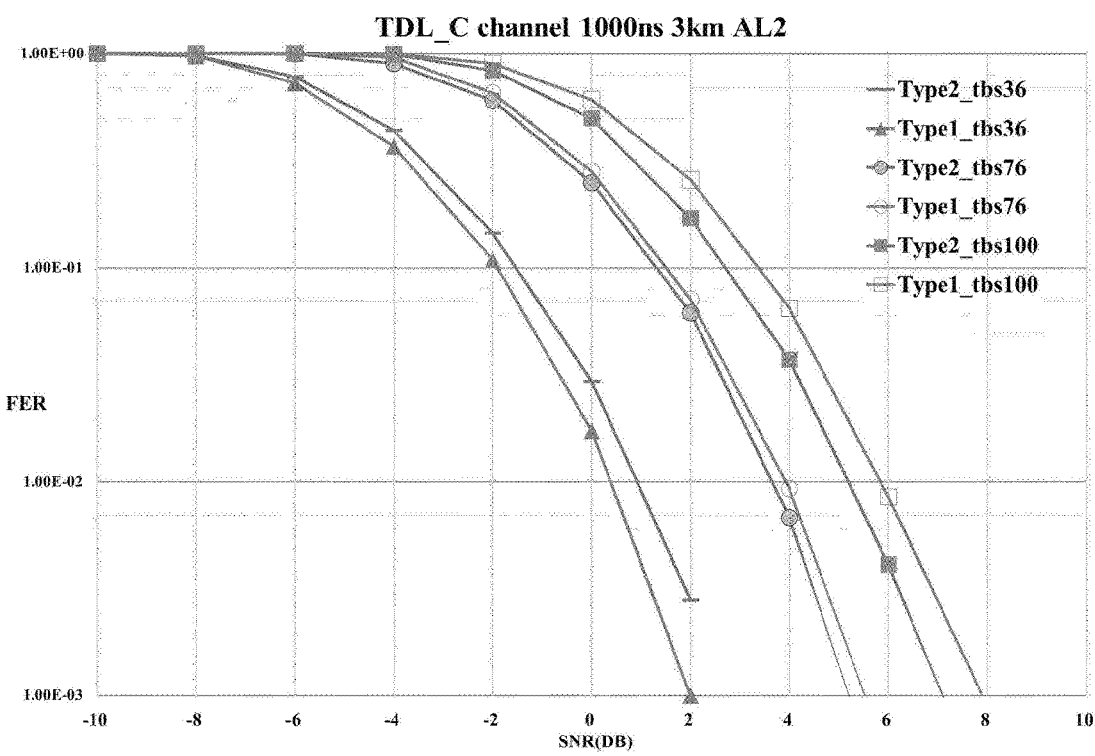
FIG. 5 illustrates channel estimation performance of time domain bundling according to an embodiment of the present invention.

FIG. 5 illustrates channel estimation performance of time domain bundling according to an embodiment of the present invention. The channel estimation performance illustrated in FIG. 5 is a result obtained under assumption that distributed mapping is applied to a candidate of aggregation level 2 and indicates performance when each type of time domain is applied to various transport block sizes (TBSs).

A coding rate according to each type and each TBS in FIG. 5 may be (Type1, 36bits)=0.1875, (Type1, 76bits)=0.3958, (Type1, 100bits)=0.5208, (Type2, 36bits)=0.15, (Type2, 76bits)=0.3167, and (Type2, 100bits)=0.4167.

Comparing the experimental result depending on a coding rate with respect to each case, it may be seen that, when a coding rate is high, time bundling of Type 2 is appropriate and, when a coding rate is low, time bundling of Type 1 is appropriate.

In other words, when a coding rate is low, this means that channel estimation performance largely affects overall performance and, when a coding rate is high, coding gain largely affects overall performance.

Based on the experimental result, a configuration of different domain bundling types depending on a coding rate (e.g., for each aggregation level, for each DCI format, for each payload size, and/or for each coding rate in consideration of reserved resource) may be proposed. For example, a coding rate-specific time bundling type may be defined. A time domain bundling type for each aggregation level may be determined by a network or may be determined for each DCI format or payload size.

To enhance system flexibility, a network/UE may divide candidates in a resource region in which time domain bundling is applied to distribute the candidates to time bundling types. For example, when the UE needs to perform blind decoding on 4 AL-1 candidates, 4 AL-2 candidates, 2 AL-4 candidates, and 2 AL-8 candidates, the UE may perform blind decoding assuming Type 1 time bundling with respect to a half of the candidates of each AL and Type 2 time bundling with respect to the other half of the candidate. For such an operation of the UE, a network may indicate a candidate for which Type 1 needs to be assumed and a candidate for which Type 2 needs to be assumed in a resource region in which time domain bundling is performed, via higher layer signaling or the like.

When an aggregation level of a candidate is differently configured for each resource region (e.g., CORESET), a time domain bundling type of a corresponding resource region may be determined according to an aggregation level. For example, when CORESET 0 and CORESET 1 are configured for a UE, only a candidate for ALs 1 and 2 is present in CORESET 0, and only a candidate for ALs 4 and 8 are present in CORESET 1, the UE may perform blind decoding assuming Type 2 time domain bundling with respect to CORESET 0 and Type 1 time domain bundling with respect to CORESET 1.

In addition, a type of time bundling may be determined depending on speed of a UE. Type 1 time domain bundling is more robust to a rapid channel change in the time domain than Type 2 time domain bundling. Based on speed, a Doppler frequency, or the like of the UE, a time domain bundling type may also be determined. To this end, the UE may periodically (or aperiodically) notify the network about the speed, the Doppler frequency, or the like.

When time domain REG bundling and frequency domain REG bundling are simultaneously applied, an RS configuration may be determined according to a time domain REG bundling type. When only the frequency domain REG bundling is applied, the RS may be transmitted in all REGs or an REG in which the RS is transmitted may be determined by a network.

Intra-CCE Bundling

Intra-CCE bundling may refer to bundling of REGs included in 1 CCE and, aforementioned time and/or frequency domain REG bundling can be applied to the intra-CCE bundling.

For a specific resource region (e.g., CORESET), network may indicate, to a UE via higher layer signaling etc., one of all or some of options (i) to (iii) below or one of all or some of options (i) to (iii) below may be predefined. For example, the network may signal at least one of options (i) to (iii) to the UE through a CORESET configuration.

(i) Whether time domain REG bundling is applied and/or bundle size: Information indicating whether time domain REG bundling is applied in a specific resource region and/or a bundle size may be transmitted via network signaling etc., or may be predefined. The information indicating whether the time domain REG bundling is applied may be replaced with signaling of a bundle size.

(ii) Whether frequency domain REG bundling is applied and/or bundle size: Information indicating whether frequency domain REG bundling is applied in a specific resource region and/or a bundle size may be transmitted via network signaling etc., or may be predefined. The information indicating whether the frequency domain REG bundling is applied may be replaced with signaling of a bundle size.

(iii) Whether time and frequency domain REG bundling is applied and/or bundle size: Time domain REG bundling and frequency domain REG bundling may be simultaneously applied. Information indicating whether time and frequency domain REG bundling are applied in a specific resource region may be transmitted via network signaling etc., or may be predefined. The information indicating whether the time and frequency domain REG bundling are applied in the region may be replaced with signaling of a bundle size for each domain.

A method of replacing the information indicating whether time/frequency domain REG bundling is applied with signaling of a bundle size is described now in more detail. When an REG bundle size is equal to or greater than 2 REGs, it may be interpreted as REG bundling is to be applied. In this case, whether the REG bundling to be applied corresponds to time domain bundling, frequency domain bundling, or time-frequency domain bundling may be determined through a bundle size. For example, when a bundle size of 2 or greater is configured in a specific resource region (e.g., CORESET) with duration of 1 symbol, it may be interpreted as frequency domain REG bundling is to be applied. When a bundle size is 2 in a specific resource region (e.g., CORESET) with duration of 2 symbols, it may be interpreted as time domain REG bundling is to be applied and, when a bundle size is equal to or greater than 3 (e.g., bundle size=6), it may be interpreted as time-frequency domain REG bundling is to be applied. When a bundle size is 3 in a specific resource region (e.g., CORESET) with duration of 3 symbols, it may be interpreted as time domain REG bundling is to be applied and, when a bundle size is equal to or greater than 4 (e.g., bundle size=6), it may be interpreted as time-frequency domain REG bundling is to be applied.

More generally, assuming CORESET duration of N-symbol (N being an integer equal to or greater than 2) and a bundle size of M-REG, in the case of N≤M, a UE may determine that time domain bundling is applied to a corresponding CORESET and, in the case of N>M, the UE may determine that time-frequency domain bundling is applied to the corresponding CORESET. When CORESET duration is 1 symbol, REG bundling may always refer to frequency domain bundling and, in this case, a bundle size may also be interpreted to be a size of frequency domain bundling.

Figure 6:
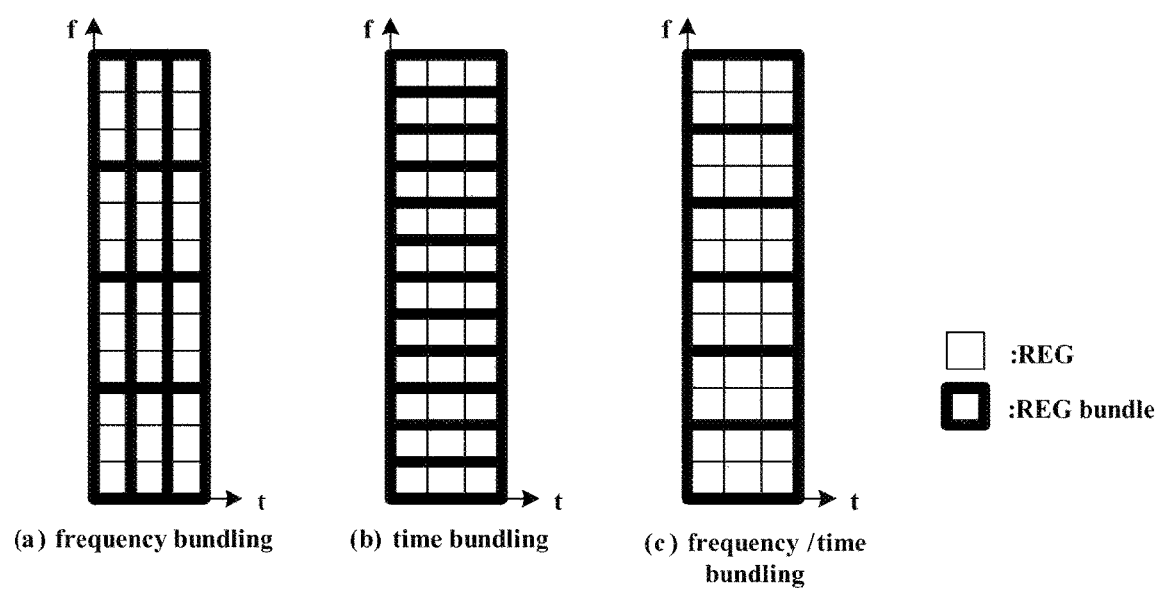
FIG. 6 illustrates bundling options according to an embodiment of the present invention.

FIG. 6 is a diagram showing bundling options according to an embodiment of the present invention.

Referring to FIG. 6, (a) frequency bundling and (b) time bundling illustrate the case in which a bundle size is 3. (c) time-frequency bundling illustrates the case in which a bundle size is 3 on the time domain and a bundle size is 2 on the frequency domain. Accordingly, in the time-frequency bundling, 6 REGs may configure one REG bundle.

In the case of intra-CCE bundling, a bundle size may also be used as a basic unit of resource indexing. For example, when time domain REG bundling is applied in a CORESET in which distributed mapping is used, CORESET duration (i.e., length (symbol number) of a CORESET in the time domain) may be replaced with a bundle size and a bundle index may be used as a basic unit of distribution (or interleaving). For example, an REG bundle size with the same size as the CORESET duration may be supported. In addition, interleaving may be performed in a unit of a REG bundle.

For example, when a specific CORESET is configured with a combination of 100 PRBs & 3 symbols and time domain REG bundling is applied to a specific CORESET, each PRB may be defined to configure one bundle. For example, three contiguous REGs on the time domain, which is positioned in the same frequency resource (i.e., the same PRB) on the frequency domain, may correspond to one REG bundle. In this case, a network may interleave a bundle index of 0 to 99 in a logical domain and may perform mapping in a physical domain.

Such a method may also be applied to the frequency domain in the same way. For example, when a bundle size for frequency domain REG bundling is signaled to 2 REGs, a UE may assume that two contiguous REGs configure one bundle in the frequency domain and may determine resource mapping or the like when performing blind detection on a corresponding CORESET.

As described in the above embodiments, a size of time domain REG bundling may be determined as a divisor of time domain duration of a resource region (e.g., CORESET) in which bundling is applied. For example, assuming four cases in which duration of a resource region in which time domain bundling is applied is 1, 2, 3, and 4, a combination of available time domain bundle sizes with respect to each case may be (1), (1, 2), (1, 3), and (1, 2, 4). In other words, in the case of resource region duration N=1, 2, 3 symbols, time domain REG bundling may not be applied (i.e., bundle size=1), or when time domain REG bundling is applied, a bundle size thereof may be interpreted to be configured to be the same as duration N of a resource region.

It may be desirable to configure a bundle size as a divisor of duration of a resource region because, when the bundle size is not configured as a divisor of duration of a resource region, the possibility that different REGs use different frequency resources in 1 bundle needs to be avoided. For example, when time domain bundling is applied in a specific CORESET, bundle size=2 REGs, and duration of a CORESET is 3 symbols, bundle 1 and bundle 3 among bundles configured in a CORESET are positioned over different PRBs and, thus, time domain bundling may not be capable of being performed with respect to bundle 1 and bundle 3.

As another example of the present invention, in the case of distributed resource mapping, only one of time/frequency domain REG bundling may also be defined to be applied. For example, it may be assumed that both time/frequency domain REG bundling are applied to a CCE including 6 REGs, a time domain bundle size is 3, and a frequency domain bundle size is 2. In this case, to easily perform distribution for acquisition of frequency diversity, a network may perform only REG bundling with respect to one domain.

In the case of localized resource mapping, application of both time/frequency domains bundling or performing of only bundling on one domain may be configured/predefined by a network. When both time/frequency domain bundling are performed, one bundle in which both bundling in two domains is applied may also be used as a basic unit of resource indexing.

The above proposed resource region may be a CORESET or a sub-CORESET included in the CORESET. sub-CORESETs may be distinguished therebetween.

Figure 7:
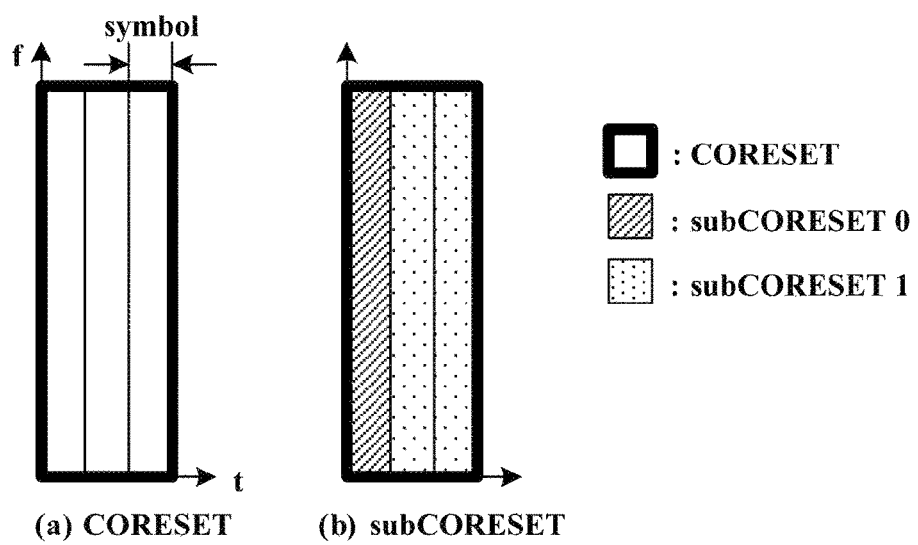
FIG. 7 illustrates a CORESET and a sub-CORESET according to an embodiment of the present invention.

FIG. 7 illustrates a CORESET and a sub-CORESET according to an embodiment of the present invention.

In (b) of FIG. 7, time domain REG bundling may not be applied and only frequency domain REG bundling may be applied to sub-CORESET0. Time domain REG bundling of bundle size 2 may be applied to sub-CORESET1. Resource indexing may be independently performed every subCORESET or may be performed on an entire CORESET or a method for resource indexing may be indicated by a network via higher layer signaling or the like.

Figure 8:
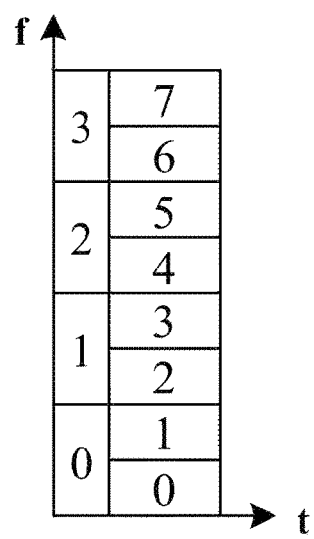
FIG. 8 is a diagram for explanation of resource indexing according to an embodiment of the present invention.
Figure 8:
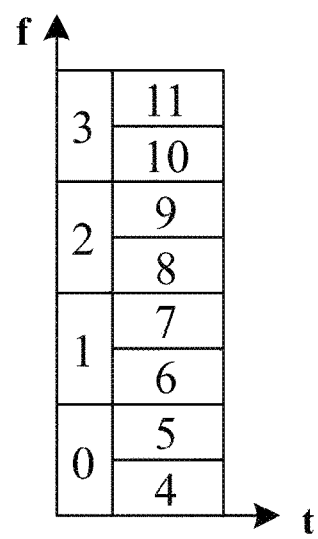

FIG. 8 is a diagram for explanation of resource indexing according to an embodiment of the present invention.

Referring to FIG. 8, (a) sub-CORESET separate indexing may easily configure different search spaces and (b) resource indexing (i.e., combined indexing) with respect to an entire CORESET may be used as one method for simultaneously performing time/frequency domain REG bundling. (a) separate indexing may also be used to distinguish between a search space for DCI that needs to be rapidly decoded and a search space for DCI with low limitation in decoding time. Although FIG. 8 illustrates the case in which resource indexing is performed from a first symbol using a frequency-first method for convenience, a resource index may also be changed by applying interleaving or the like.

Thus far, although bundling between contiguous REGs in the time/frequency domain has been mainly described, time/frequency REG bundling may be defined by a bundling pattern. For example, when a bundling pattern is defined like {2, 1, 2, 1} for frequency domain REG bundling, {REG0, REG1}, {REG2}, {REG3, REG4}, and {REG5} among 6 REGs configuring one CCE may each configure an REG bundle.

The bundling pattern may also be used in time domain REG bundling. For example, when duration of a resource region in which time domain REG bundling is applied is 3 symbols, a network may signal a bundling pattern of {2, 1}. A bundling pattern {2, 1} may mean that 2 contiguous REGs configure on bundle and one subsequent REG configures another bundle in the time domain. Time bundling Type 1/2 for each bundle included in the pattern may be predefined or may be signaled by the above proposed method.

Inter-CCE Bundling

Like intra-CCE bundling, in the case of inter-CCE bundling, whether bundling is applied and/or a bundle size may also be signaled by a network. The aforementioned REG level bundling related proposals may also be applied to CCE level bundling and, in the above proposals, an REG may be replaced with a CCE and inter-CCE bundling may be embodied.

When inter-CCE bundling is embodied using the aforementioned method, there may be additional limitation in a procedure such as resource indexing. For example, assuming that the inter-CCE bundling is always applied, an inter-CCE bundle size may need to be assumed and CCE indexing may need to be performed. For example, even if CCE indexes are contiguous, the inter-CCE bundling may need to be performed on different CCEs with noncontiguous time/frequency positions and, thus, CCE indexing may be performed in consideration of a bundle size.

Accordingly, to apply the inter-CCE bundling, a network may configure only whether the inter-CCE bundling is applied and a bundle size and, when the inter-CCE bundling is applied, a UE may assume the same precoding to be applied when contiguous resources are present in the bundle size in the time/frequency domain.

A bundle size for the inter-CCE bundling may be independent from an intra-CCE bundle size. Alternatively, when a maximum bundle size for the inter-CCE bundling is separately defined and REGs belonging to different CCEs are adjacent to each other, assumption of the same precoding in a maximum bundle size by a UE may be predefined or may be signaled by a network.

In addition, inter-CCE bundling in a CORESET to which interleaving is applied may be replaced with a configuration of an interleaving unit size. To effectively configure a hierarchical PDDCH structure and/or to reduce blocking probability between CORESETs, interleaving of an REG bundle set unit may be introduced. For example, a network may contiguously deploy REGs belonging to each CCE configuring a candidate with a high aggregation level in a CORESET to which interleaving is applied and may interleave an REG bundle set. When REG bundle set-based interleaving is performed and a size of an REG bundle set is configured (for each CORESET), a UE may assume that the size of the REG bundle set is the same as an inter-CCE REG bundle size.

For example, when REG {0, 1, 2, 3, 4, 5} configures CCE0 and REG {6, 7, 8, 9, 10, 11} configures CCE1 in 1 symbol CORESET in which interleaving is performed, and CCE0 and CCE1 configure a candidate with aggregation level 2, a network may pair an REG configuring each CCE one by one and may perform interleaving. For example, REG {0, 6}, {1, 7}, {2, 8}, {3, 9}, {4, 10}, and {5, 11} may be used in units of interleaving.

<Wideband Reference Signal>

To enhance system flexibility in NR, a method of reducing a common RS and an operation in terms of a UE-specific demodulation reference signal (DMRS) has been discussed. However, a wideband RS may be periodically transmitted for the purpose of channel estimation performance and measurement of a control channel, phase tracking, and so on. When the wideband RS is used, the number of RSs to be used by a UE during channel estimation may be increased to enhance channel estimation performance. In addition, the UE may perform wideband RS cell or beam level measurement to more effectively perform a procedure such as a cell change and a beam change.

A UE-dedicated beamforming method, a transmission diversity method, or the like may be applied to a control channel of NR to transmit control information and, a wideband RS may be more appropriate for the transmission diversity method. In the UE-dedicated beamforming method, precoding for maximizing a reception SNR depending on a channel situation of each UE may be applied and, thus, may be more appropriate for a narrowband operation. Accordingly, use of the transmission diversity method may be more appropriate in a resource region in which the wideband RS is applied.

In NR, a scheme such as 2-Port space frequency block coding (SFBC), 1-Port RB level precoder cycling, and 1-Port stacked cyclic delay diversity (SCDD) may be used as the transmission diversity method. The 1-port RB level precoder cycling may have excellent performance at a high AL and may disadvantageously enable decoding using the same operation as UE-dedicated beamforming in terms of a UE. However, to apply the wideband RS to the 1-port RB level precoder cycling scheme, additional signaling may be required.

A UE may assume that the same precoder is used in a region in which the wideband RS is transmitted and, thus, may perform channel estimation using all RSs in the corresponding region and may perform measurement, tracking, or the like. On the other hand, 1-port RB level precoder cycling may be a method for acquisition of beam diversity gain using different precoders for RBs. Accordingly, to simultaneously apply the precoder cycling scheme and the wideband RS, the following information elements need to be signaled. The following information elements may be indicated via higher layer signaling or the like or may be signaled in an initial access procedure. All or some of the following information elements may be signaled to a UE and, when only some of the following information elements, non-signaled information elements may be predefined.

(i) Period of Wideband RS

A period with which a wideband RS is transmitted, a subframe set, or the like may be indicated to the UE via higher layer signaling or the like. The UE may perform control channel decoding based on the wideband RS in a slot in which the wideband RS is transmitted.

(ii) Transmission Region of Wideband RS

The time/the frequency domain in a slot in the wideband RS is transmitted may be signaled. The frequency domain of the wideband RS may be signaled in units of multiples of a UE minimum bandwidth (i.e., a minimum BW specified in NR) and a starting point or the like of the wideband RS may be additionally signaled. A symbol (or symbol set) in which the wideband RS is transmitted may also be signaled as the time domain of the wideband RS.

As another method, a transmission region of the wideband RS may be signaled in units of CORESETs (or subCORESETs). For example, the transmission region of the wideband RS may be signaled using a method of adding whether the wideband RS is transmitted or the like to a CORESET configuration. For example, as shown in (b) of FIG. 7, when a subCORESET is configured and a wideband RS is applied only to subCORESET0, a different precoder from a precoder of subCORESET0 in which the wideband RS is transmitted may be applied to an REG (or REG bundle) of subCORESET1.

(iii) The Same Precoding Pattern in Wideband

As described above, when the 1-port RB level precoder cycling is used, a precoder may be changed for each RB or RB group. Accordingly, an eNB may signal an RB pattern or the like to which the same precoder is applied among regions in which the wideband RS is transmitted. For example, a network may notify a UE about precoding information in a resource region in which the wideband RS is applied.

Although FIG. 9 below exemplifies a method of transmitting precoding information to a UE using a concept of a pattern, a sub-pattern, or the like, the present invention is not limited thereto and precoding information may be transmitted using various methods. To reduce signaling overhead or the like, at least some of the following precoding information items may be predefined. For example, a precoding related pattern in a resource region in which the wideband RS is used may be predefined. For example, the precoding related pattern may be defined using the following proposed pattern and sub-pattern, and so on.

Figure 9:
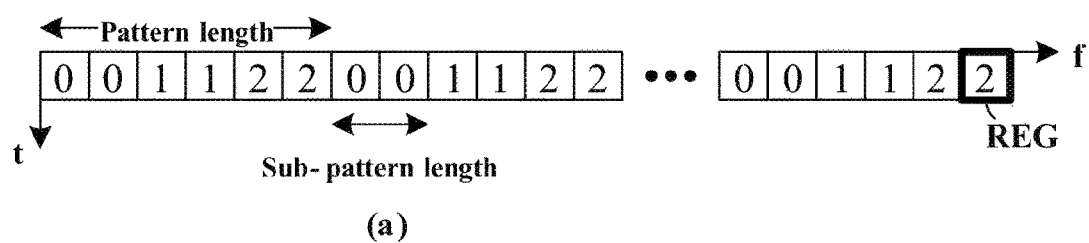
FIG. 9 is a diagram for explanation of a method of indicating the same precoding pattern according to an embodiment of the present invention.
Figure 9:
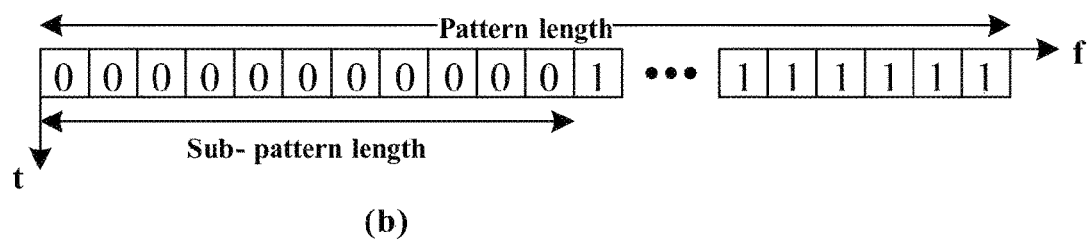

FIG. 9 is a diagram for explanation of a method of indicating the same precoding pattern according to an embodiment of the present invention. In FIG. 9, the same numeral may refer to application of the same precoding.

When 1-port RB level precoder cycling is used, a network may signal a pattern length, a sub-pattern length, and the like to notify a UE about sections in which the same precoding is applied. Here, the pattern may refer to a precoder cycling period and the sub-pattern may refer to resource sections in which the same precoding is applied.

For example, in (a) of FIG. 9, a network may signal a pattern length of 6 and a sub-pattern length of 2 to a UE. The UE may apply the pattern and the sub-pattern to a section in which the wideband RS is applied to identify resources to which the same precoding is applied and may perform channel estimation, measurement, tracking, and so on based on the corresponding resource.

(b) of FIG. 9 illustrates another example of application of a wideband RS. As shown in (b) of FIG. 9, when the wideband RS is transmitted, this may be effective to perform measurement for each section. When REG/REG bundles configuring a CCE or different CCEs configuring a candidate are distributed in different sub-patterns, a valid bundle size may be relatively increased and, thus, frequency diversity gain may be obtained and channel estimation performance may also be enhanced.

<Configurable RS Density>

With regard to the RS mapping methods proposed in FIG. 4, (a) Type 1 may be referred to as a full loaded RS method, (b) Type 2 may be referred to as a front loaded RS method, and the front loaded RS method may advantageously ensure a lower coding rate for a control signal than the full loaded RS method.

In addition, a method of lowering a coding rate in the full loaded RS method may be proposed. For example, to lower a coding rate, RS density may be adjusted based on channel estimation performance.

Figure 10:
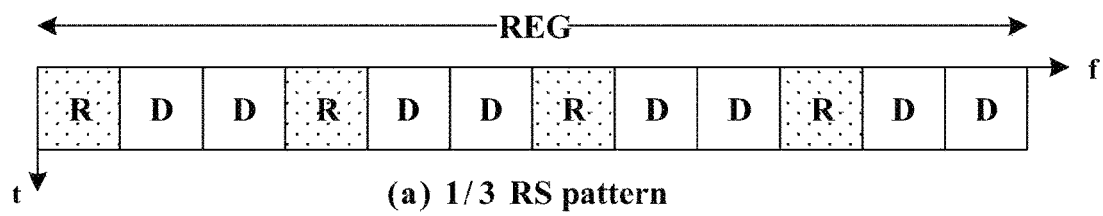
FIG. 10 illustrates RS patterns for adjusting RS patterns for adjusting RS density according to an embodiment of the present invention.
Figure 10:
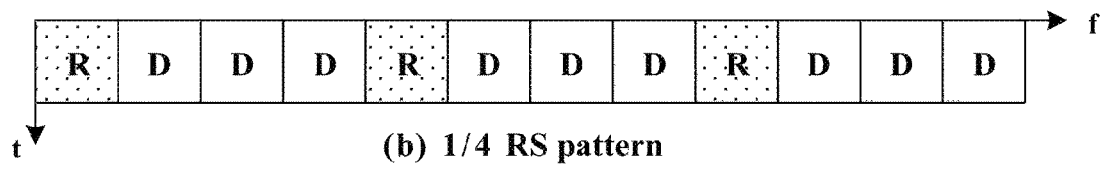
Figure 10:
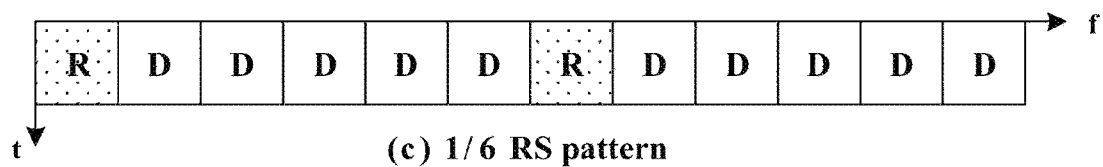

FIG. 10 illustrates RS patterns for adjusting RS density according to an embodiment of the present invention. In FIG. 10, an RS pattern (i.e., a position of an RE in which an RS is transmitted) may be changed. For example, an RS may be mapped as shown in FIG. 4.

Referring to FIG. 10, RS density may be differently configured according to each RS pattern. Accordingly, the number of data REs for transmission of control information may also be differently configured according to each RS pattern. All or some of 3 RS patterns may be defined for an NR control channel.

A network may configure an RS pattern with relatively low density for a UE with an excellent channel environment or a UE (or a UE group), channel estimation performance of which is ensured. For example, an RS pattern to be assumed by a UE in a corresponding CORESET for each CORESET may be configured. The UE may assume an RS pattern in the corresponding CORESET according to an RS configuration for each CORESET.

An RS pattern to be assumed by a UE in each CORESET may be determined in association with CORESET duration (without additional signaling). For example, when configurable CORESET duration is 1, 2, and 3 symbols, a UE may assume that RS patterns are used in respective durations. When CORESET duration is 1, (a) 1/3 RS pattern may be used, when CORESET duration is 2, 1/4 RS pattern may be used, and when CORESET duration is 3, use of 1/6 RS pattern may be configured/predefined.

Application of such association between CORESET duration and an RS pattern may be determined according to whether time domain bundling is performed. For example, in the case of a CORESET to which time domain bundling (e.g., a UE may assume that the same precoding is applied to REGs belonging to the same bundle in the time domain) is applied, a predetermined RS pattern may be used according to CORESET duration. When the time domain bundling is not applied, only a specific RS pattern (e.g., 1/3 RS pattern) may be predefined to be used irrespective of CORESET duration. This is because, when the time domain bundling is applied, channel estimation performance is enhanced compared with time domain bundling and, thus, even if RS density per REG is lowered, channel estimation performance is not largely degraded.

Through such a method, additional coding gain may be obtained while channel estimation performance is ensured. For example, when an RS pattern with low density is used, a similar effect to Type 2 of FIG. 4 may be expected.

An RS pattern to be assumed by a UE in each CORESET may be determined in association with a bundling option of each CORESET (without additional signaling). REG bundling may be possible with respect to NR-PDCCH in the time/frequency domain and performance enhancement may be expected via REG bundling in terms of channel estimation. As such, when sufficient channel estimation performance is capable of being obtained via REG bundling, it may be desirable to lower RS density to acquire gain in terms of a coding rate.

Accordingly, according to an embodiment of the present invention, RS density may be determined in association with a whole bundle size. For example, in the time/frequency domain, a bundle size may be represented according to (Time, Frequency)=(1, 6), (2, 3), (3, 2), (2, 1), (3, 1) (where, in the case of 1 symbol CORESET, (1, 2) and (1, 3) are also possible) and, when the sum of bundle sizes of the time and frequency domains is equal to or greater than 5, an RS pattern corresponding to RS density of 1/6 may be used. On the other hand, when the sum of bundle sizes in the time and frequency domains is less than 5, an RS pattern corresponding to RS density of 1/3 may be applied.

As another example, when time domain bundling is used for the purpose of reducing of a coding rate (e.g., an RS is transmitted only to some of REGs of the time domain bundle), RS density may be determined based on a frequency domain bundle size. For example, the frequency domain bundle size is greater than 2 REGs, an RS pattern corresponding to RS density of 1/6 may be used and, when the frequency domain bundle size is 1 or 2, an RS pattern corresponding to RS density of 1/3 and 1/4 may be used.

The above proposed configurable RS pattern (or CORESET duration-based RS pattern) may enhance efficiency in terms of channel estimation performance and a coding rate but an operating method for the case in which CORESETs with different CORESET durations overlap with each other needs to be defined.

Figure 11:
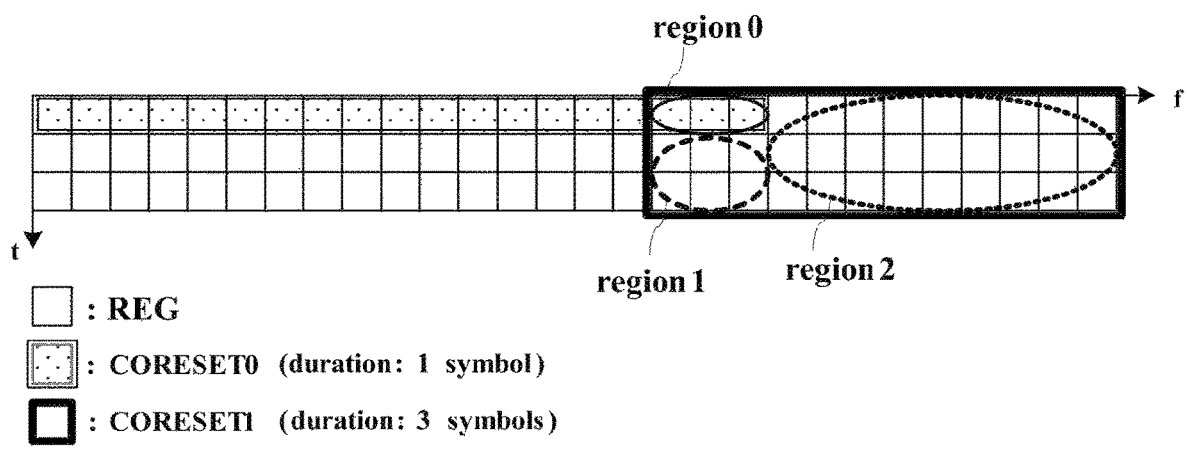
FIG. 11 illustrates the case in which CORESETs with different CORESET durations overlap with each other according to an embodiment of the present invention.

FIG. 11 illustrates the case in which CORESETs with different CORESET durations overlap with each other according to an embodiment of the present invention.

Referring to FIG. 11, CORESET 0 of Duration 1 and CORESET 1 of Duration 3 may partially overlap with each other. It may be assumed that 1/3 RS pattern is used in CORESET0 and time domain bundling is applied and 1/6 RS pattern is used in CORESET1 (e.g., a bundle size: 1 in the frequency domain & 3 in the time domain). In this case, an RS pattern is redundantly configured in Region0 and, thus, when how an RS patterns is processed in Region 0 is not defined, there may be a problem in that a UE wrongly refers to an RS during blind decoding of the UE as well as channel estimation or decoding performance is degraded.

To overcome a problem that arises when RS patterns are configured to overlap with each other in the time/frequency domain due to overlap between different CORESETs, the following methods (i) to (iv) are proposed. A specific option among the following options may be predefined to be used when CORESETs overlap with each other or may be configured for a UE by a network. In addition, the following options may also be applied when CORESETs overlap with each other irrespective of an RS pattern (e.g., even when RS patterns of different CORESETs are the same).

(i) Option 1: Assumption of Only RS Pattern of Corresponding CORESET

For an NR-PDCCH, a UE-specific DMRS may be basically used. Accordingly, a UE may assume only an RS pattern of a corresponding CORESET while performing blind decoding on a control channel candidate that belongs to a specific CORESET. For an operation such as Option 1, it may be assumed that a network does not transmit different PDCCHs to the same resource using the same RS portion. For example, it may be assumed that an RS pattern configured in CORESET1 is always used in Regions 1 and 2 in FIG. 11. The UE may assume that only an RS pattern of CORESET0 is present while performing blind decoding on a candidate of CORESET0 in Region 0, may assume that only an RS pattern of CORESET1 while performing blind decoding on a candidate of CORESET1 in Region 0, and may perform blind decoding.

(ii) Option 2: Change in RS Pattern

When a plurality of CORESETs are configured for one UE and a section in which CORESETs overlap with each other in the time/frequency domain is present, an RS pattern of a specific CORESET may be changed in all CORESETs or a section in which the CORESETs overlap with each other. To this end, a network may configure RS pattern information (e.g., v-shift information indicating frequency shift) of a corresponding CORESET together while configuring a CORESET.

Alternatively, a UE may assume that an RS pattern of a specific CORESET is changed to a predefined pattern when CORESETs overlap with each other without signaling of a network.

To this end, priority between CORESETs may be defined and an RS pattern of a CORESET with low priority may be changed. A CORESET with high priority may be, for example, a CORESET in which an RS (e.g., wideband RS) transmitted irrespective of whether a PDCCH is transmitted and a UE may assume that an RS pattern of such a CORESET is not changed.

When an RS pattern is changed to a predefined pattern, the predefined pattern may be defined through, for example, a v-shift value (e.g., a position of an RS is moved by a v-shift value in the frequency domain).

(iii) Option 3: Rate-Matching of Different CORESET

It may be assumed that an RS (e.g., Wideband RS) transmitted irrespective of whether a PDCCH is transmitted is transmitted in a specific CORESET (or specific time/the frequency domain) and that another CORESET that overleaps with the corresponding CORESET is configured. In this case, a UE may assume that RS pattern positions of different CORESETs are rate-matched in mapping of control information while performing blind decoding on each CORESET.

In this case, since control information is rate-matched with respect to an RS pattern position, a coding rate of the control information may be increased and, as a result, decoding performance of the UE may be degraded. When RS patterns are redundantly configured in the same time/frequency resource, an RS may not be frequently used in a corresponding region. For example, when 1/3 RS pattern and 1/6 RS pattern of FIG. 10 are used in different CORESETs, respectively, RS REs according to the 1/6 RS pattern may be redundantly configured as RS REs according to the 1/3 pattern.

To overcome this problem, when Option 3 is used, an RS pattern needs to be determined in such a way that RS RE positions are not redundant between RS patterns. To prevent an RE in which an RS is transmitted from being redundant, the method of changing an RS pattern configured in Option 2 may also be used.

(iv) Option 4: Use of RS Pattern of CORESET with High Priority

When an RS (e.g., wideband RS) transmitted irrespective of whether a PDCCH is transmitted in a specific CORESET (or specific time/the frequency domain) and another CORESET that overlaps with the corresponding CORESET is configured, a UE may assume only an RS pattern of a CORESET with high priority in a section (e.g., region 0 of FIG. 11) in which CORESETs overlap with each other while performing blind decoding on each CORESET. For example, the UE may assume that an RS pattern defined in a CORESET with low priority is not used in a section in which CORESETs overleap with each other.

Priority of CORESETs may be configured by a network or may be predefined. When the priority of CORESETs is predefined, high priority may be assigned to a CORESET including a common search space, a CORESET in which a wideband RS (e.g., RSs that are transmitted at a time interval in a predetermined region irrespective of whether a PDCCH is transmitted) is transmitted, or the like.

When a CORESET in which a wideband RS is transmitted and a CORESET in which a DMRS is transmitted entirely or partially overlap with each other (e.g., when a wideband RS is used in CORESET 0 and a DMRS is used in CORESET1 in FIG. 11) and Option 3 or Option 4 is used, even if time domain bundling is applied to CORESET1, a UE may separately perform channel estimation with respect to each of Region0 and Region1. For example, the UE may apply the channel estimation result using the wideband RS to a corresponding REG in Region0 and may apply the channel estimation result using the DMRS to the corresponding to REG in Region1. In this case, the UE may assume that time domain bundling is applied only to Region1. A time domain bundle size in a region in which CORESETs overlap with each other may be interpreted to be different from a bundle size of a corresponding CORESET. Time domain bundling may be determined according to a configuration of a CORESET in Region2.

Figure 12:
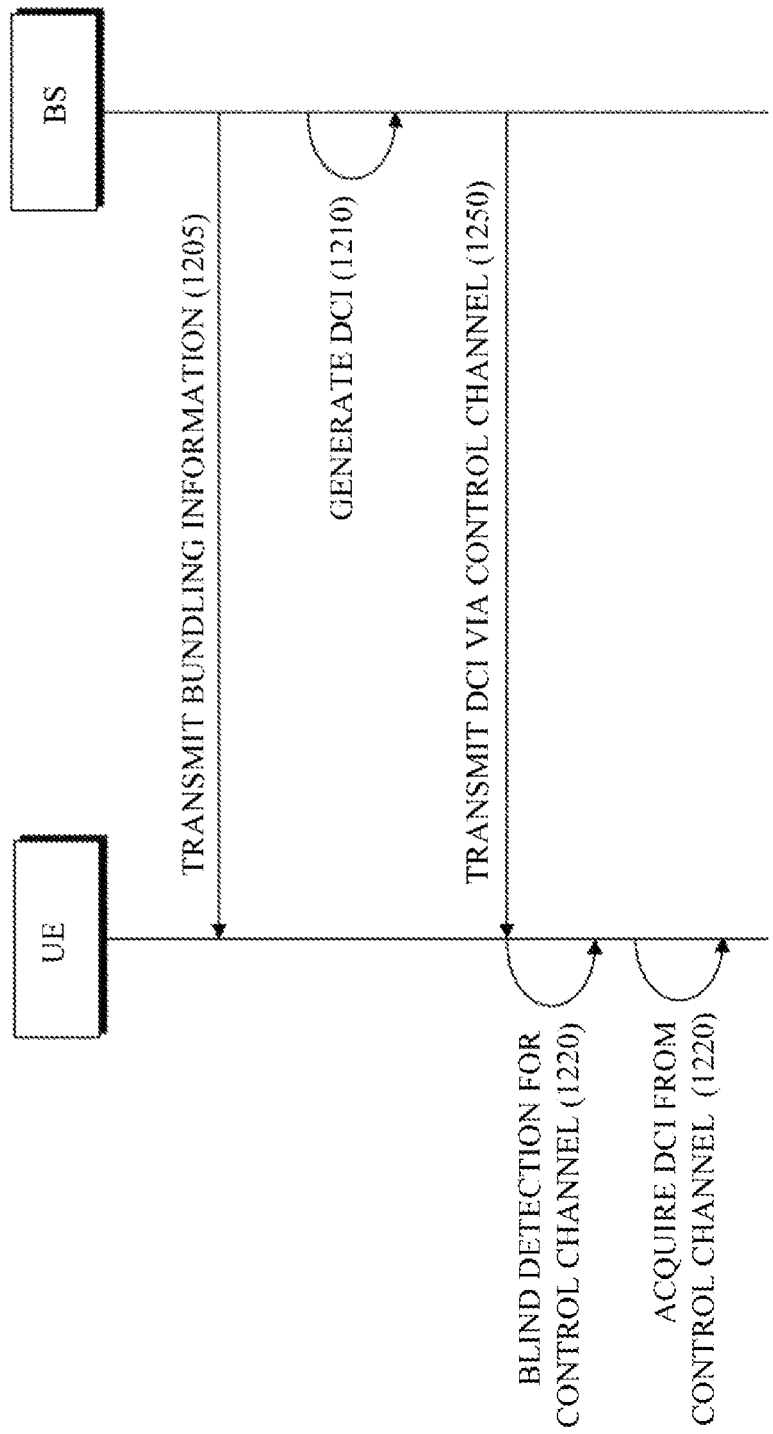
FIG. 12 illustrates a flow of a method of transmitting and receiving downlink control information (DCI) according to an embodiment of the present invention.

FIG. 12 illustrates a flow of a method of transmitting and receiving downlink control information (DCI) according to an embodiment of the present invention. FIG. 12 illustrates an example of the aforementioned methods and the present invention is not limited to FIG. 12 and, thus, a repeated description of the above description may not be given here.

Referring to FIG. 12, an eNB may transmit bundling information on resource element groups (REGs) via higher layer signaling (1205). Each REG may correspond to 1 resource block (RB) and 1 orthogonal frequency divisional multiplexing (OFDM) symbol. The eNB may transmit bundling information via higher layer signaling of a CORESET configuration.

One or more CORESETs may be configured in one UE. For example, an eNB may transmit one or more or more CORESET configurations to one UE to configure one or more CORESETs. Bundling information and a control channel element (CCE)-to-REG mapping type may be indicated (e.g., indicated though a CORESET configuration) for each CORESET. The bundling information may include bundle size information indicating the number of REGs included in 1 REG bundle. The CCE-to-REG mapping type of a CORESET may indicate one of a localized mapping type (e.g., non-interleaved mapping) and an interleaved mapping type.

Hereinafter, for convenience of description, a CCE-to-REG mapping type of a CORESET is assumed to be configured as an interleaving mapping type. In addition, a CORESET may be assumed to be configured on a plurality of OFDM symbols. For example, the number of a plurality of OFDM symbols for configuring a CORESET may be 2 or 3.

The eNB may generate DL control information (DCI) (1210).

The eNB may transmit the generated DCI through a PDCCH (1215).

When bundling information indicates a first value, the eNB may perform bundling such that only REGs locating on a same RB and corresponding to different OFDM symbols in the CORESET, are bundled as 1 REG bundle. When the bundling information indicates a second value, the eNB may perform bundling such that the REGs locating on the same RB and corresponding to the different OFDM symbols are bundled as 1 REG bundle along with REGs locating on different RBs in the CORESET. The eNB may transmit the DCI by applying same precoding for REGs belonging to a same REG bundle as a result of REG bundling.

The UE may perform blind detection for a physical downlink control channel (PDCCH) in a control resource set (CORESET) configured on a plurality of OFDM symbols (1220).

The UE may acquire DL control information (DCI) from the blind-detected PDCCH (1225). When the bundling information indicates a first value, the UE may perform bundling such that only REGs locating on a same RB and corresponding to different OFDM symbols in the CORESET, are bundled as 1 REG bundle. When the bundling information indicates a second value, the UE may perform bundling such that the REGs locating on the same RB and corresponding to the different OFDM symbols are bundled as 1 REG bundle along with REGs locating on different RBs in the CORESET. For example, when the bundling information indicates the first value, the UE may perform time domain REG bundling and, when the bundling information indicates the second value, the UE may perform time-frequency domain REG bundling.

The UE may perform the blind detection for the PDCCH by assuming same precoding for REGs which belong to a same REG bundle as a result of REG bundling. For example, the UE may perform demodulation for the PDCCH by assuming that the same precoding is applied to RSs received through REGs belonging to the same REG bundle and.

When the bundling information indicates the first value, 1 REG bundle size may be configured to be the same as the number of the plurality of OFDM symbols for configuring a CORESET.

When the bundling information indicates the second value, 1 REG bundle size may be configured to be the same as the number of REGs included in 1 control channel element (CCE).

Interleaving for CCE-to-REG mapping may be performed in a unit of a REG bundle using an REG bundle index.

A supported bundle size may be determined according to a CCE-to-REG mapping type.

For example, bundling information may include at least one of intra-CCE bundle size information for bundling of REGs belonging to the same control channel element (CCE) and inter-CCE bundle size information for bundling of REGs belonging to different control channel elements (CCEs). When the bundling information includes the inter-CCE bundle size information, the UE may perform blind detection for the PDCCH by assuming the same precoding with respect to REGs of different CCEs belonging to the same inter-CCE bundle.

Figure 13:
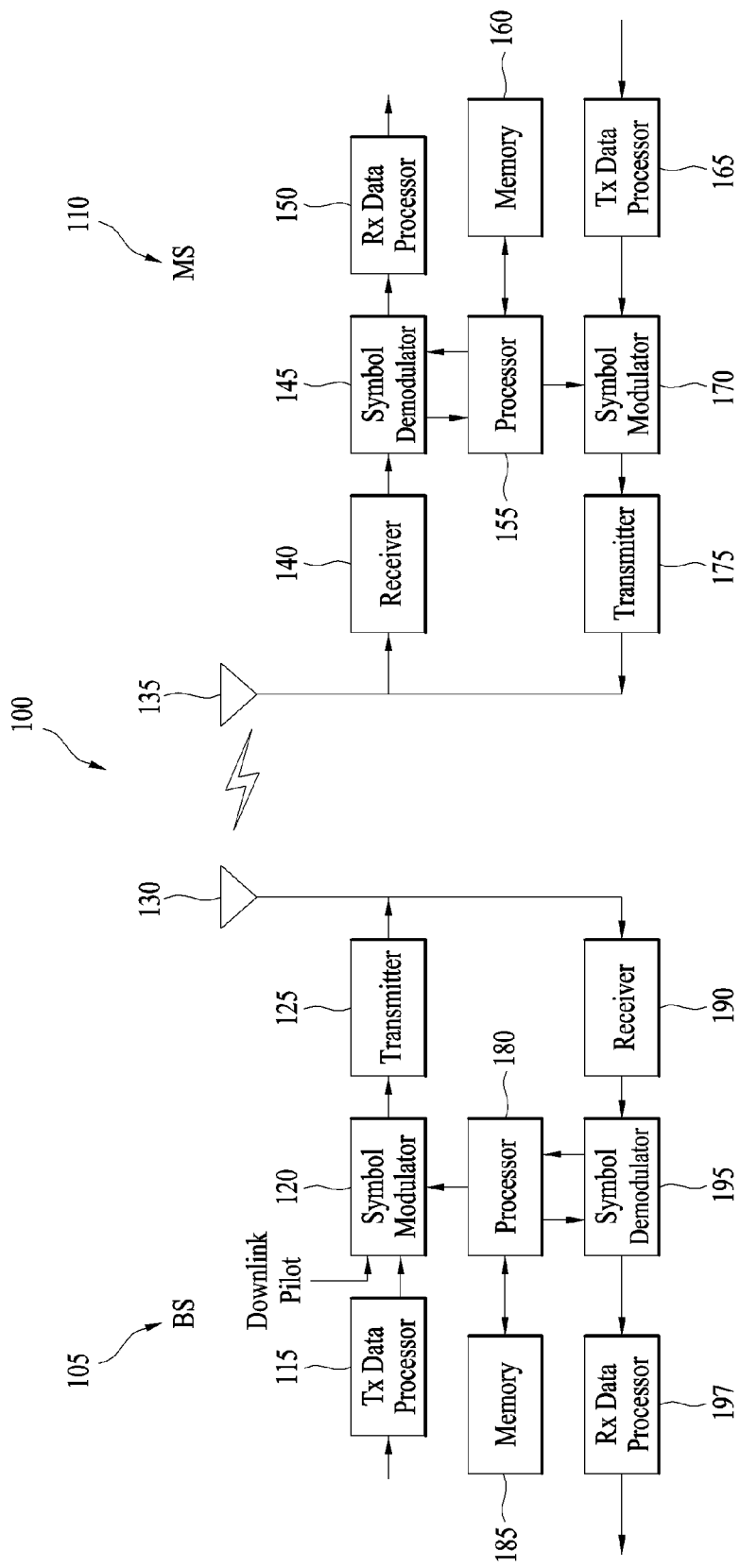
FIG. 13 illustrates a base station (BS) and a user equipment (UE) according to an embodiment of the present invention.

FIG. 13 is a block diagram illustrating a structure of a base station (BS) 105 and a UE 110 in a wireless communication system 100 according to an embodiment of the present invention. The structure of the BS 105 and the UE 110 of FIG. 13 are merely an embodiment of a BS and a UE for implementing the aforementioned method and the structure of a BS and a UE according to the present invention is not limited to FIG. 13. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, the present invention may be applied to various wireless communication systems.

The invention claimed is:

1. A method of receiving a physical downlink control channel (PDCCH) by a user equipment (UE) in a wireless communication system, the method comprising:

receiving bundle size information related to a bundle size of resource element groups (REGs) over which same precoding is applied, each REG occupying 1 resource block (RB) in a frequency domain during 1 orthogonal frequency divisional multiplexing (OFDM) symbol in a time domain; and receiving the PDCCH on a control resource set (CORESET) configured with a plurality of REG bundles in a CORESET duration that spans a plurality of OFDM symbols in the time domain, based on REGs in each REG bundle, wherein the plurality of REG bundles in the CORESET are mapped to control channel elements (CCEs) by an interleaving, with each CCE comprising 6 REGs, and wherein, in a state in which the bundle size of REGs indicated by the bundle size information is a first bundle size, the first bundle size is equal to a number of the plurality of OFDM symbols that configure the CORESET duration.

2. The method of claim 1, wherein in the state in which the bundle size of the REGs is the first bundle size, only REGs that occupy a same RB in the frequency domain and different OFDM symbols in the time domain are bundled as one REG bundle.

3. The method of claim 1, wherein in a state in which the bundle size of the REGs is a second bundle size different from the first bundle size, the second bundle size is equal to an integer multiple of the number of the plurality of OFDM symbols that configure the CORESET duration.

4. The method of claim 3, wherein in the state in which the bundle size of the REGs is the second bundle size, REGs that occupy different RBs in the frequency domain and different OFDM symbols in the time domain are bundled as one REG bundle.

5. The method of claim 3, wherein in the state in which the bundle size of the REGs is the second bundle size, the second bundle size is equal to 6.

6. The method of claim 1, wherein a plurality of CORESETs comprising the CORESET are configured for the UE, and wherein the method further comprises:
receiving, for each of the plurality of CORESETs, a corresponding bundle size information for REGs in the CORESET.

7. The method of claim 1, wherein the plurality of REG bundles in the CORESET are mapped to the CCEs by the interleaving in units of REG bundles based on an REG bundle index.

8. The method of claim 1, further comprising obtaining downlink control information (DCI) from the PDCCH.

9. The method of claim 1, wherein the number of the plurality of OFDM symbols that configure the CORESET duration is equal to 2 or 3.

10. A method of transmitting a physical downlink control channel (PDCCH) by a base station (BS) in a wireless communication system, the method comprising:
transmitting bundle size information related to a bundle size of resource element groups (REGs) over which same precoding is applied, each REG occupying 1 resource block (RB) in a frequency domain during 1 orthogonal frequency divisional multiplexing (OFDM) symbol in a time domain; and
transmitting the PDCCH on a control resource set (CORESET) configured with a plurality of REG bundles in a CORESET duration that spans a plurality of OFDM symbols in the time domain, based on precoding REGs in each REG bundle,
wherein the plurality of REG bundles in the CORESET are mapped to control channel elements (CCEs) by an interleaving, with each CCE comprising 6 REGs, and
wherein, in a state in which the bundle size of REGs indicated by the bundle size information is a first bundle size, the first bundle size is equal to a number of the plurality of OFDM symbols that configure the CORESET duration.

11. The method of claim 10, wherein in the state in which the bundle size of the REGs is the first bundle size, only REGs that occupy a same RB in the frequency domain and different OFDM symbols in the time domain are bundled as one REG bundle.

12. The method of claim 10, wherein in a state in which the bundle size of the REGs is a second bundle size different from the first bundle size, the second bundle size is equal to an integer multiple of the number of the plurality of OFDM symbols that configure the CORESET duration.

13. The method of claim 12, wherein in the state in which the bundle size of the REGs is the second bundle size, REGs that occupy different RBs in the frequency domain and different OFDM symbols in the time domain are bundled as one REG bundle.

14. The method of claim 12, wherein in the state in which the bundle size of the REGs is the second bundle size, the second bundle size is equal to 6.

15. The method of claim 10, wherein a plurality of CORESETs comprising the CORESET are configured, and
wherein the method further comprises:
transmitting, for each of the plurality of CORESETs, a corresponding bundle size information for REGs in the CORESET.

16. The method of claim 10, wherein the plurality of REG bundles in the CORESET are mapped to the CCEs by the interleaving in units of REG bundles based on an REG bundle index.

17. The method of claim 10, further comprising transmitting downlink control information (DCI) through the PDCCH.

18. The method of claim 10, wherein the number of the plurality of OFDM symbols that configure the CORESET duration is equal to 2 or 3.

19. A user equipment (UE) configured to receive a physical downlink control channel (PDCCH) in a wireless communication system, the UE comprising:
a transceiver;
at least one processor; and
at least one computer memory operably connectable to the at least one processor and storing instructions that, when executed, causes the at least one processor to perform operations that comprise:
receiving, through the transceiver, bundle size information related to a bundle size of resource element groups (REGs) over which same precoding is applied, each REG occupying 1 resource block (RB) in a frequency domain during 1 orthogonal frequency divisional multiplexing (OFDM) symbol in a time domain; and
receiving, through the transceiver, the PDCCH on a control resource set (CORESET) configured with a plurality of REG bundles in a CORESET duration that spans a plurality of OFDM symbols in the time domain, based on REGs in each REG bundle having been precoded,
wherein the plurality of REG bundles in the CORESET are mapped to control channel elements (CCEs) by an interleaving, with each CCE comprising 6 REGs, and
wherein, in a state in which the bundle size of REGs indicated by the bundle size information is a first bundle size, the first bundle size is equal to a number of the plurality of OFDM symbols that configure the CORESET duration.

20. The UE of claim 19, wherein in the state in which the bundle size of the REGs is the first bundle size, only REGs that occupy a same RB in the frequency domain and different OFDM symbols in the time domain are bundled as one REG bundle.

* * * * *